United States Patent
Okada et al.

[11] Patent Number: 5,980,856
[45] Date of Patent: Nov. 9, 1999

[54] SYNTHETIC CHALCOALUMITE-TYPE COMPOUNDS AND PROCESSES FOR PRODUCING THE SAME

[75] Inventors: Akira Okada, Takamatsu; Kazushige Oda, Kita-gun; Kanako Shimizu, Sakaide, all of Japan

[73] Assignee: Kyowa Chemical Industry Co., Ltd., Takamatsu, Japan

[21] Appl. No.: 08/976,640

[22] Filed: Nov. 24, 1997

[30] Foreign Application Priority Data

Nov. 26, 1996 [JP] Japan ................................. 8-329032
Jun. 11, 1997 [JP] Japan ................................. 9-319149

[51] Int. Cl.$^6$ ............................ C01F 7/00; C01B 25/00; C01B 31/30; C01B 33/00
[52] U.S. Cl. ................. 423/600; 423/179.5; 423/115; 423/104; 423/127; 423/43; 423/140; 423/164; 423/554; 423/556; 423/306; 423/420.2; 423/327.1; 423/518; 423/395; 423/594; 502/414
[58] Field of Search ................. 423/179.5, 115, 423/104, 127, 43, 140, 164, 554, 556, 306, 420.2, 327.1, 518, 395, 594, 600; 502/414

[56] References Cited

U.S. PATENT DOCUMENTS

| | | | |
|---|---|---|---|
| 4,514,389 | 4/1985 | Miyata | 423/306 |
| 5,356,567 | 10/1994 | Ogawa et al. | 423/115 |
| 5,424,351 | 6/1995 | Komatsu et al. | 423/179.5 |

FOREIGN PATENT DOCUMENTS

| | | |
|---|---|---|
| 0549340 | 6/1993 | European Pat. Off. |
| 0636580 | 2/1995 | European Pat. Off. |
| 0672619 | 9/1995 | European Pat. Off. |
| 9-169875 | 6/1997 | Japan. |
| WO96/28508 | 9/1996 | WIPO. |
| 97/00828 | 1/1997 | WIPO. |
| 9-143324 | 6/1997 | WIPO. |

Primary Examiner—Steven Bos
Attorney, Agent, or Firm—Sherman & Shalloway

[57] ABSTRACT

This invention relates to synthetic chalcoalumite-type compounds represented by formula (1) below:

$$M^{2+}_{a-x/2}Li^{1+}_x Al^{3+}_4 (OH)_b (A^{n-})_c \cdot mH_2O \qquad (1)$$

(wherein
M$^{2+}$ represents at least one of the following divalent metal ions: Zn$^{2+}$, Cu$^{2+}$, Ni$^{2+}$ and Mg$^{2+}$,
a is 0.6<a<1.2,
x is 0<x<1.4,
b is 11<b<13,
A$^{n-}$ is at least one member of the group consisting of SO$_4^{2-}$, HPO$_4^{2-}$, CO$_3^{2-}$, SiO$_3^{2-}$, SO$_3^{2-}$, HPO$_3^{2-}$, H$_2$PO$_4^-$, NO$_3^-$ and OH$^-$,
c is 0.5<c<1.2, and
m represents a number of 1 to 4)
and processes for their preparation. The synthetic chalcoalumite-type compounds of the present invention are conveniently used for adsorbing agents of acidic substances, anion exchangers, infrared absorption agents for agricultural films, deodorants and recording media for ink jet, etc.

6 Claims, 3 Drawing Sheets

SYNTHETIC CHALCOALUMITE-TYPE COMPOUNDS AND PROCESSES FOR PRODUCING THE SAME

DETAILED DESCRIPTION OF THE INVENTION

1. Industrially Applicable Field

This invention relates to novel chalcoalumite-type compounds and processes for producing the same.

More specifically, the invention relates to novel synthetic chalcoalumite-type compounds which are suitable for adsorbing agents of acidic substances, anion-exchangers, infrared absorbents for agricultural films, deodorants, recording media for ink jet and the like; and to processes for producing the same.

2. Prior Art

As known chalcoalumite compounds, there are the following substances.

1) As naturally existing substances, JCPDS (Joint Committee ON Powder Diffraction Standards) card lists the following:

| Chalcoalumite compound | JCPDS Card No. | Lattice spacing [d(Å)] | Chemical formula |
|---|---|---|---|
| Chalcoalumite | 25–1430 | 8.50x, 4.25$_9$ 4.18$_3$, 7.90$_2$ | CuAl$_4$SO$_4$(OH)$_{12}$.3H$_2$O |
| Chalcoalumite | 8–142 | 8.92x, 8.29x 4.24x, 4.36$_9$ | CuAl$_4$SO$_4$(OH)$_{12}$.3H$_2$O |
| Mbobomkulite | 35–696 | 8.55x, 4.27$_4$ 7.87$_2$, 4.55$_2$ | (Ni, Cu)Al$_4$[(NO$_3$)$_2$(SO$_4$)](OH)$_{12}$.3H$_2$O |
| Nickelalumite | 35–698 | 8.54x, 4.27$_6$ 7.88$_2$, 2.00$_2$ | (Ni, Cu)Al$_4$[(NO$_3$)(SO$_4$)](OH)$_{12}$.3H$_2$O |

Chalcoalumite: CuAl$_4$SO$_4$(OH)$_{12}$.3H$_2$O
Mbobomkulite: (Ni,Cu)Al$_4$[(NO$_3$)$_2$(SO$_4$)](OH)$_{12}$.3H$_2$O
Nickelalumite: (Ni,Cu)Al$_4$[(SO$_4$)(NO$_3$)](OH)$_{12}$. 3H$_2$O 2) Our earlier filed Patent Application Hei-8 (1996)-73094 (Title of the invention: Synthetic Chalcoalumite Compounds and Process for Production Thereof) has disclosed, as divalent metal ions of the constituent elements, Zn$^{2+}$, Co$^{2+}$ and Mg$^{2+}$, besides naturally existing Cu$^{2+}$ and Ni$^{2+}$; and as anions of the constituent elements, HPO$_4^{2-}$, CO$_3^{2-}$, SO$_3^{2-}$, SiO$_3^{2-}$, CrO$_4^{2-}$ and Cl$^-$, besides naturally existing SO$_4^{2-}$ and NO$_3^-$.

Problems to be Solved by the Invention and Means for Solving the Problems

The present inventors have found novel chalcoalumite-type compounds can be synthesized in which a part of heretofore known divalent metal ions constituting chalcoalumite structure is replaced by monovalent lithium ions (Li$^{1+}$) That is, the novel chalcoalumite-type compounds of the present invention are synthetic chalcoalumite-type compounds represented by formula (1) below:

$$M^{2+}{}_{a-x/2}Li_x{}^{1+}Al_4{}^{3+}(OH)_b(A^{n-})_c.mH_2O \quad (1)$$

wherein

M$^{2+}$ represents at least one of the following divalent metal ions: Zn$^{2+}$, Cu$^{2+}$, Ni$^{2+}$ and Mg$^{2+}$.
a is 0.6<a<1.2,
x is 0<x<1.4,
b is 11<b<13,
A$^{n-}$ is at least one member of the group consisting of SO$_4^{2-}$, HPO$_4^{2-}$, CO$_3^{2-}$, SiO$_3^{2-}$, SO$_3^{2-}$, HPO$_3^{2-}$, H$_2$PO$_4$, NO$_3$ and OH$^-$,
c is 0.5<c<1.2, and
m represents a number of 1 to 4.

The novel synthetic chalcoalumite-type compounds of the invention have, similarly to heretofore known chalcoalumite compounds, positively charged solid surface and adsorb negatively charged acidic dyes (cf. FIG. 2). A part of anions of the SO$_4^{2-}$ type compounds is substitutable with other anions having analogous anionic form, size, charge and complex-forming ability to those of SO$_4^{2-}$, for example, HPO$_4^{2-}$, CrO$_4^{2-}$, SO$_3^{2-}$, HPO$_3^{2-}$ and SiO$_3^{2-}$. The compounds have the characteristic feature imparted by the substitution with monovalent lithium ion (Li$^{1+}$) that their anion exchange ability is increased over that of heretofore known chalcoalumite compounds (cf. FIG. 3).

Chalcoalumite compounds can be identified by powder X-ray diffraction (XRD) method. JCPDS (Joint Committee ON Powder Diffraction Standards) card numbers and main four-lattice spacings d(Å) of known chalcoalumite compounds are shown in the following.

The synthetic chalcoalumite-type compounds of the invention form superlattice structure based on Al(OH)$_3$ (gibbsite) structure and a diffraction line corresponding to the lattice plane (300) of the compound is detected in the vicinity of 2θ(Cu K$_α$-ray)=62.4 to 62.6° by the XRD method. This is a diffraction line based on the regular configuration of the Al atom of the above gibbsite structure.

The synthetic chalcoalumite-type compounds of the invention can be produced by the following process which comprises subjecting a water-soluble aluminum salt, lithium salt and a compound of one or more elements selected from Zn, Cu, Ni and Mg which compound is water-soluble in the pH range of about 4 to about 7, to coprecipitation reaction with an alkali at a reaction pH of about 4 to about 7 and a temperature of about 10 to about 50° C., and then subjecting the resultant coprecipitate to hydrothermal reaction as it is at a reaction pH of the above-mentioned range and a temperature of about 80 to about 170° C., preferably about 100 to about 150° C. for about 1 to 24 hours. Or the compounds are prepared through a process in which the precipitate which is coprecipitated under similar conditions to the above is filtered off, washed with water, the solid matter is suspended in water and subjected to a hydrothermal reaction at a pH range from about 4 to 7 and at about 80 to about 170° C., preferably at about 100 to about 150° C., for about 1 to 24 hours.

More specifically, the coprecipitation reaction is conducted by adding to an aqueous solution containing metal ions of at least one kind selected from Zn$^{2+}$, Cu$^{2+}$, Ni$^{2+}$ and Mg$^{2+}$, Li$^{1+}$ and Al$^{3+}$ in an amounts of: no higher than 5.0, preferably no higher than 3.0, of Li$^{1+}$ in terms of Li$^{1+}$/M$^{2+}$ atomic ratio and 0.05~0.25, preferably 0.10~0.22, of M$^{2+}$ in terms of M$^{2+}$/Al$^{3+}$ atomic ratio, 0.85~1.1 equivalents to the sum of the monovalent, divalent and trivalent metal ions of an alkali at a reaction pH range of about 4~7 and at temperatures of about 10~50° C., under stirring. By either subjecting the so formed precipitate to a hydrothermal reaction at the above-mentioned pH range and at temperatures from about 80~170° C., preferably from about 100~150° C., for about 1~24 hours or filtering off the precipitate which was coprecipitated under similar conditions to the above, washing the recovered product with water, suspending the solid product in water and subjecting the suspension to a hydrothermal reaction at the same pH range as above-mentioned and at temperatures ranging from about 80~170° C., preferably from about 100~150° C., for about 1~24 hours, the chalcoalumite-type compounds of the invention can be synthesized.

The synthetic chalcoalumite-type compounds of the present invention can also be favorably produced by mixing a compound of at least one element selected from Zn, Cu, Ni and Mg, said compound being water-soluble within a pH range of from about 4 to 7; aqueous solution of sulfates nitrates or chlorides of Li and Al; and at least one compound selected from the group consisting of ammonia, sodium hydroxide, potassium hydroxide, magnesium hydroxide, magnesium oxide, sodium aluminate and zinc oxide, at predetermined ratios; suspending the mixture in water, and subjecting the suspension at a pH ranging from about 4~7 to a hydrothermal reaction at a pH within a range of about 4~7 and at a temperature ranging from about 80~170° C. for about 1~24 hours.

In the synthetic chalcoalumite-type compounds of the present invention which contain $SO_4^{2-}$ as anion, a part of the $SO_4^{2-}$ anion may be ion-exchanged with one member selected from a group of anions consisting of $HPO_4^{2-}$, $CO_3^{2-}$, $SO_3^{2-}$, $HPO_3^{2-}$, $SiO_3^{2-}$, $NO_3^-$, $H_2PO_4^-$ and $OH^-$. It is also possible to incorporate the intended anion other than $SO_4^{2-}$ as a part of the anions in the compounds, by adding aqueous solution of a salt containing the intended anion at the reaction time.

Therefore, a synthetic chalcoalumite-type compounds of the present invention which contains another anion besides $SO_4^{2-}$ can be prepared through the steps of preparing a chalcoalumite-type compound of above formula (1) in which $A^{n-}$ is $SO_4^{2-}$, and then substituting a part of $SO_4^{2-}$ in the formed compound with an anion selected from the group consisting of $HPO_4^{2-}$, $CO_3^{2-}$, $SiO_3^{2-}$, $SO_3^{2-}$, $HPO_3^{2-}$, $NO_3^-$, $H_2PO_4^-$ and $OH^-$. The substitution reaction is carried out by adding a chalcoalumite-type compound of the formula (1) wherein the anion ($A^{n-}$) is $SO_4^{2-}$ to an aqueous solution of a salt of such an anion or an alkali metal hydroxide at a temperature of about 20 to about 80° C., and stirring the mixture for several minutes to about 1 hour. In this occasion, the salt of the anion or the alkali metal hydroxide is used in such an amount that the equivalent number of the anion to the Al atom of the formula (1) ranges from 0.25 to 1.0.

In the production of the synthetic chalcoalumite-type compounds of the invention, the temperature of the coprecipitation reaction is not particularly limited, but it is economical to carry out the reaction at a temperature of about 10~50° C., preferably from about 20~40° C., for about 10 minutes to about 2 hours.

In the hydrothermal reaction, when the reaction temperature is not higher than about 80° C., the formation of the chalcoalumite structure becomes insufficient, and when it is about 170° C. or higher, boehmite gel and $3Al_2O_3.4SO_3.10-15\ H_2O$ are undesirably formed.

The proper reaction time is usually about 1 to about 24 hours, preferably from about 3 to about 12 hours.

In preparing the synthetic chalcoalumite-type compounds of the present invention, the coprecipitation reaction and hydrothermal reaction are necessarily carried out at a reaction pH range of about 4~7. When the reaction pH is lower than about 4, the solubility of the coprecipitate increases to lower the yield, and when the reaction pH is higher than about 7, hydroxide(s) of the divalent metal(s) is/are formed, which causes formation of a mixture of hydrotalcite-type layer complex hydroxide(s) wherein part of the cation(s) of the hydroxide(s) of the divalent metal(s) is substituted with trivalent cation(s), with aluminum hydroxide. Again, as earlier stated, when the reaction is carried out at an atomic ratio of lithium ion to divalent metal ion, $Li^{1+}/M^{2+}$, of not higher than 5.0, preferably not higher than 3.0, and also at that of the divalent metal ion to aluminum ion, $M^{2+}/Al^{3+}$, of 0.05~0.25, preferably 0.10~0.22, crystalline synthetic chalcoalumite-type compound is formed.

Examples of supply sources of metal ions such as $Zn^{2+}$, $Cu^{2+}$, $Ni^{2+}$, $Mg^{2+}$, $Li^{1+}$ and $Al^{3+}$ include zinc compounds which are water-soluble at a pH range of from about 4 to about 7, such as zinc chloride, zinc nitrate, zinc sulfate, zinc oxide, zinc hydroxide and zinc acetate; copper chloride, copper nitrate, copper sulfate, copper acetate; nickel chloride, nickel sulfate, nickel nitrate, nickel acetate; lithium chloride, lithium nitrate, lithium sulfate, lithium hydroxide, lithium carbonate; aluminum chloride, aluminum nitrate, aluminum sulfate and sodium aluminate; magnesium chloride, magnesium nitrate, magnesium sulfate, magnesium acetate; and such magnesium compounds as magnesium oxide and magnesium hydroxide which are water-soluble at a pH range of from about 4 to about 7.

Examples of alkali for precipitating the monovalent, divalent and trivalent metal ions include: sodium hydroxide, potassium hydroxide, ammonia water, ammonia gas, magnesium oxide and magnesium hydroxide. These alkali compounds can be used in an amount of 0.85 to 1.1 equivalents to the total of the monovalent, divalent and trivalent metal ions.

When a synthetic chalcoalumite-type compound of the invention is utilized as an additive for plastics, its particles may be given a surface treatment to improve its compatibility with resins and process-ability, with at least one surface-treating agent selected from the group consisting of higher fatty acids, anionic surfactants, phosphoric esters, silanes, titanates, aluminum coupling agents and fatty acid esters of polyhydric alcohols.

Specific examples of preferred surface-treating agents are as follows: higher fatty acids such as stearic acid, oleic acid, erucic acid, palmitic acid and lauric acid and alkali metal salts of these higher fatty acids; anionic surfactants such as sulfate esters of higher alcohols, eg., stearyl alcohol and oleyl alcohol, sulfate ester salts of polyethyleneglycol ethers, amide bond sulfate ester salts, ether bond sulfonate salts, ester bond sulfonates, amide bond alkylallylsulfonate salts and ether bond alkylarylsulfonate salts; phosphoric esters such as acid-type and alkali metal salts or amine salts, which are mono- or diesters between orthophosphoric acid and oleyl alcohol, stearyl alcohol or the like, or mixtures of these esters; silane coupling agents such as vinylethoxysilane, vinyl-tris(2-methoxy-ethoxy)silane and y-aminopropyltrimethoxysilane; titanate coupling agents such as isopropyl triisostearoyl titanate, isopropyl tris (dioctylpyrophosphate) titanate and isopropyl tridecylbenzenesulfonyl titanate; aluminum coupling agents such as acetoalkoxyaluminum diisopropylate; etc.

As methods of the surface treatment, there are wet method and dry method. In the wet method, a surface-treating agent as named above in a liquid or emulsion state is added to slurry of the synthetic chalcoalumite-type compound, and sufficiently mixed under stirring at a temperature up to about 100° C. In the dry method, powder of the synthetic chalcoalumite-type compound is put in a mixer such as a Henschel mixer, to which the surface-treating agent in a liquid, emulsion or solid state is added and sufficiently mixed with or without heating. Preferably, the surface-treating agent is used in an amount of about 0.1 to about 15% by weight of the synthetic chalcoalumite-type compound.

EXAMPLES

Figure 1:
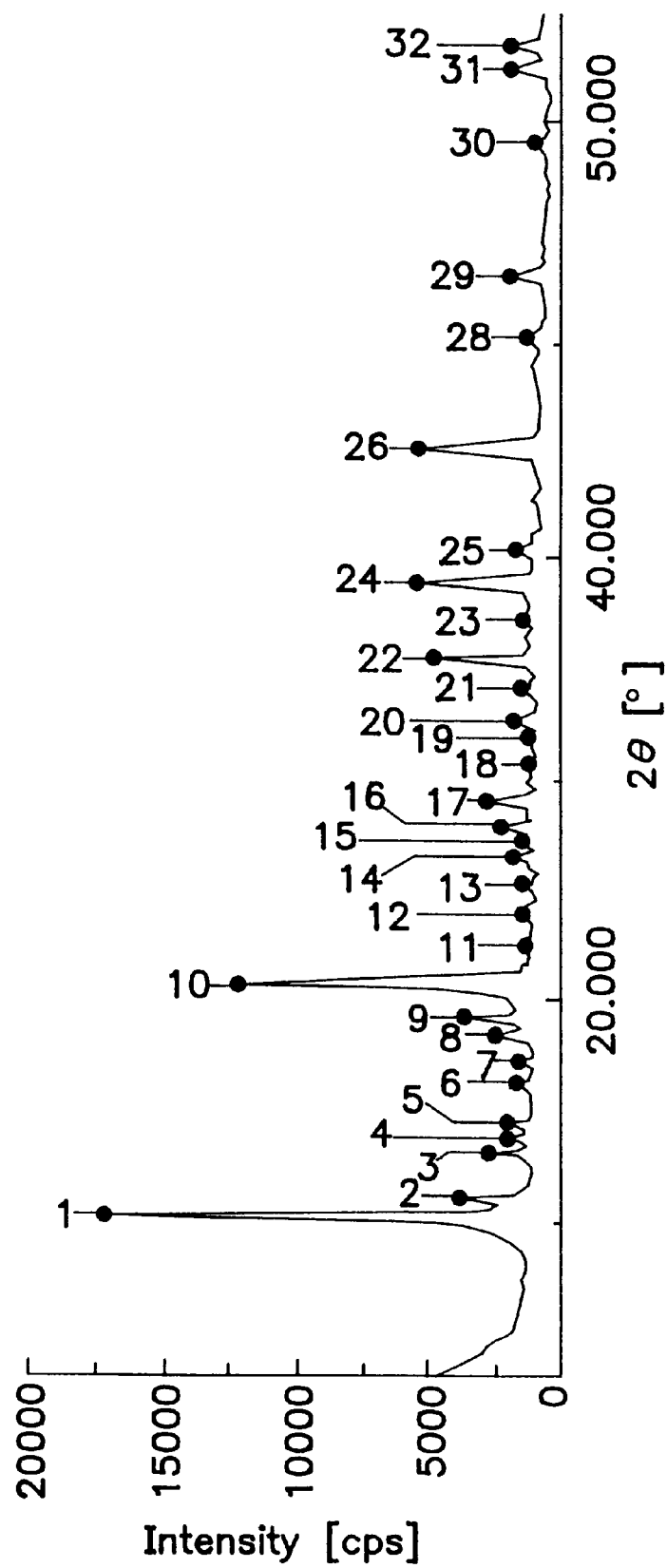
FIG. 1 is an XRD measurement chart of the synthetic chalcoalumite-type compound of Example 2.
Figure 2:
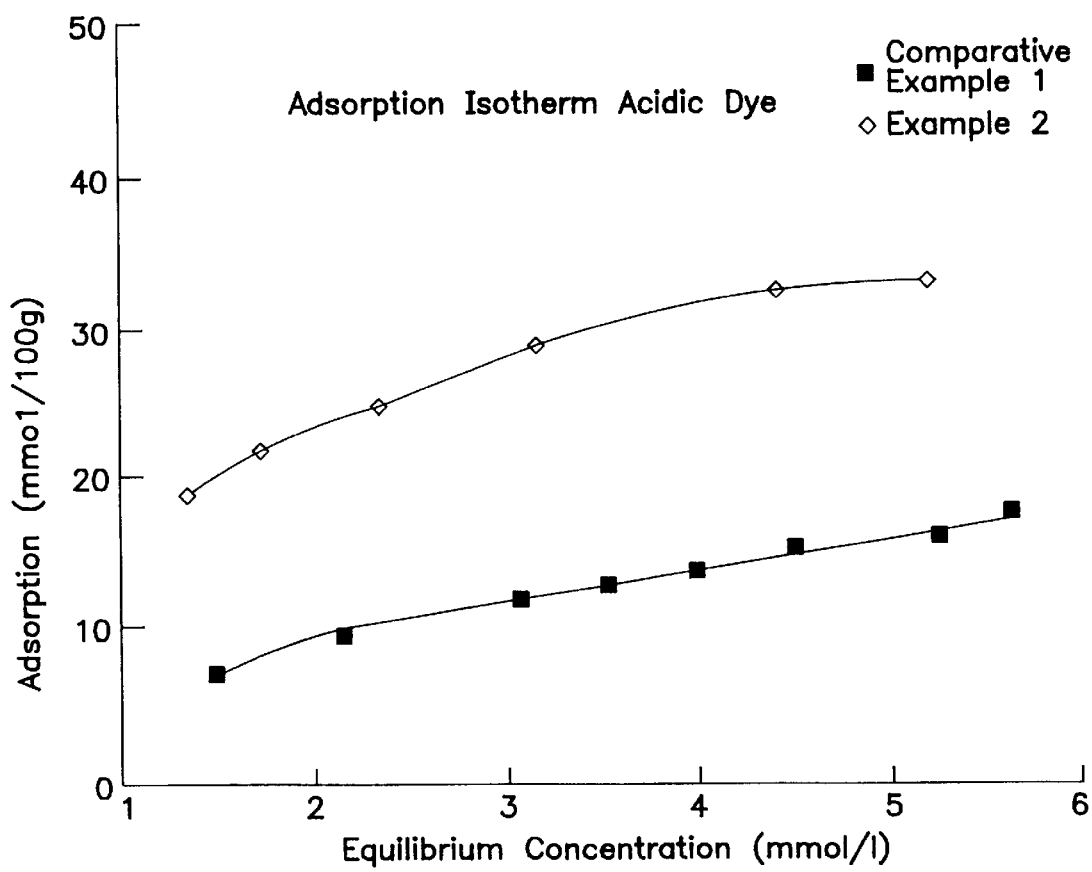
FIG. 2 shows adsorption isotherms of an acid dye (Naphthol Yellow S) on the synthetic chalcoalumite-type compound of Example 2 and the chalcoalumite compound of Comparative Example 1 (30° C., 6 hours' treatment).
Figure 3:
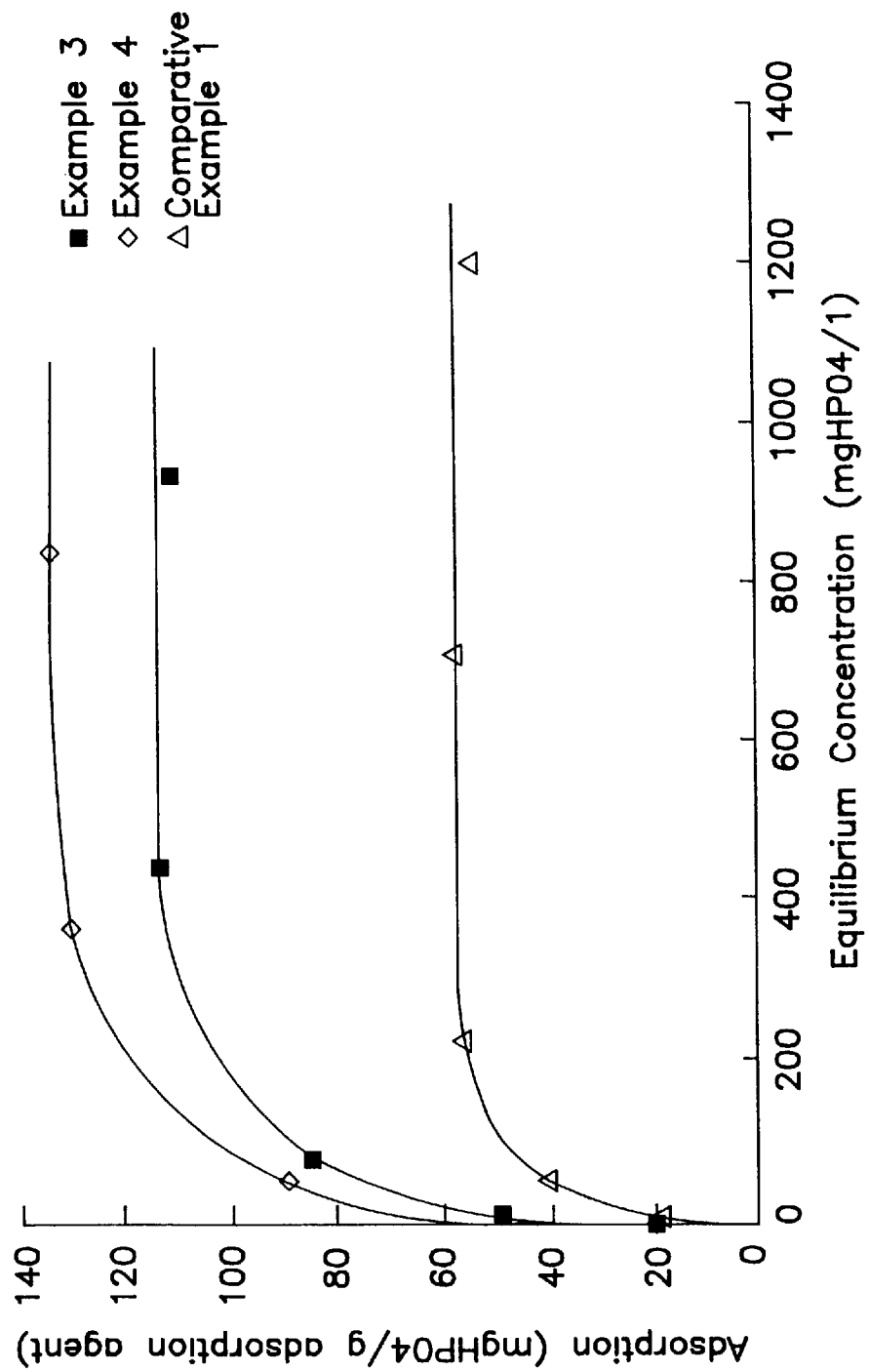
FIG. 3 shows adsorption isotherms of $HPO_4^{2-}$ on the synthetic chalcoalumite-type compounds of Examples 3 and 4 and the chalcoalumite compound of Comparative Example 1 (30° C., 1 hour's treatment: reagent: $Na_2HPO_4.12H_2O$).

Hereinafter the invention is explained in further details, referring to working Examples.

Example 1

In deionized water, 11.5 g of first grade reagent zinc sulfate ($ZnSO_4.7H_2O$), 1.28 g of special grade reagent lithium sulfate ($Li_2SO_4.H_2O$) and 97 ml of aqueous aluminum sulfate solution at a concentration of 1.03 mol/liter were dissolved and the total amount of the solution was adjusted to 700 ml. The solution was put in a 1-liter beaker, to which 17.6 g of magnesium hydroxide (a commercial product, content 99.6%) was added at room temperature under vigorous stirring with a homomixer. After about 30 minutes' stirring, the resulting suspension having a pH of 5.80 at 28° C. was transferred to an autoclave of 0.98 liter in capacity, and subjected to a hydrothermal reaction at 120° C. for 4 hours. Subsequently cooled suspension had a pH of 4.90 at 24.3° C. The resulting precipitate was separated by filtration, washed with water and then with acetone, and dried at 75° C. for 15 hours. The yield of the dried product was 24.3 g, which was ground and sieved with a 100-mesh sieve.

The product was identified to be a chalcoalumite-type compound by XRD measurement and chemical analysis.

| Main d(Å) values by XRD measurement | | |
|---|---|---|
| 8.55 Å | 6.11 | 1.486 |
| 4.27 | 5.45 | 1.463 |
| 4.19 | 5.11 | |
| 7.90 | 4.80 | |
| 6.72 | 3.06 | |
| 6.39 | 2.52 | |

The chemical formula obtained upon the chemical analysis was as follows:

$Zn_{0.64}Li_{0.34}Al_{4.0}(OH)_{11.84}(SO_4)_{0.89}.2.7H_2O$.

Example 2

In deionized water, 8.63 g of first grade reagent zinc sulfate ($ZnSO_4.7H_2O$), 2.56 g of special grade reagent lithium sulfate ($Li_2SO_4.H_2O$) and 97 ml of aqueous aluminum sulfate solution at a concentration of 1.03 mol/liter were dissolved and the total amount of the solution was adjusted to 700 ml. The solution was put in a 1-liter beaker, to which 12.47 g of magnesium oxide (a commercial product, content 97%) was added at room temperature under vigorous stirring with a homomixer. After about 90 minutes' stirring, the resulting suspension having a pH of 5.93 at 28.4° C. was filtered and the recovered solid matter was washed with water and then suspended in deionized water to provide about 700 ml of the suspension. The suspension was transferred into an autoclave of 0.98 liter in capacity and subjected to a hydrothermal reaction at 140° C. for 4 hours. Subsequently cooled suspension had a pH of 5.72 (28. 1° C.). The resulting precipitate was separated by filtration, washed with water and then with acetone, and dried at 75° C. for 15 hours. The yield of the dried product was 21.7 g, which was ground and sieved with a 100-mesh sieve.

The product was identified to be a chalcoalumite-type compound by XRD measurement (cf. FIG. 1) and chemical analysis.

| Main d(Å) values by XRD measurement | | |
|---|---|---|
| 8.56 Å | 6.12 | 1.486 |
| 4.27 | 5.47 | 1.463 |
| 4.19 | 5.13 | |
| 7.92 | 4.81 | |
| 6.73 | 3.06 | |
| 6.42 | 2.52 | |

The chemical formula obtained upon the chemical analysis was as follows:

$Zn_{0.51}Li_{0.41}Al_{4.0}(OH)_{12.0}(SO_4)_{0.72}.1.5H_2O$.

Example 3

In deionized water, 8.92 g of special grade reagent zinc nitrate ($Zn(NO_3)_2.6H_2O$), 4.14 g of special grade reagent lithium nitrate ($LiNO_3$) and 117 ml of aqueous aluminum sulfate solution at a concentration of 1.03 mol/liter were dissolved, and the total amount of the solution was adjusted to 600 ml. The solution was put in a 1-liter beaker, into which 212 ml of first grade reagent 3.4N NaOH was added at room temperature under vigorous stirring with a homomixer, followed by about 30 minutes' stirring. The reaction suspension (pH 6.39 at 32.3° C.) was filtered, and whereby recovered coprecipitate was washed with water and suspended in deionized water to provide about 700 ml of the suspension. The suspension was transferred into an autoclave of 0.98 liter in capacity and subjected to a hydrothermal reaction at 140° C. for 4 hours. Subsequently cooled suspension had a pH of 5.97 (27.7° C.). The resulting precipitate was separated by filtration, washed with water and then with acetone, and dried at 75° C. for 15 hours. The yield of the dried product was 26.9 g, which was ground and sieved with a 100-mesh sieve.

The product was identified to be a chalcoalumite-type compound by XRD measurement and chemical analysis.

| Main d(Å) values by XRD measurement | | |
|---|---|---|
| 8.54 Å | 6.10 | 1.486 |
| 4.27 | 5.45 | 1.463 |
| 4.19 | 5.10 | |

-continued

| Main d(Å) values by XRD measurement | |
|---|---|
| 7.87 | 4.78 |
| 6.71 | 3.06 |
| 6.39 | 2.52 |

The chemical formula obtained upon the chemical analysis was as follows:

$$Zn_{0.46}Li_{0.72}Al_{4.0}(OH)_{12.08}(SO_4)_{0.76}(CO_3)_{0.02} \cdot 1.6H_2O.$$

Example 4

In deionized water, 4.09 g of special grade reagent zinc chloride ($ZnCl_2$), 3.82 g of special grade reagent lithium chloride (LiCl) and 146 ml of aqueous aluminum sulfate solution at a concentration of 1.03 mol/liter were dissolved and the total amount of the solution was adjusted to 600 ml. The solution was put in a 1-liter beaker, to which 265 ml of first grade reagent 3.4N NaOH was added at room temperature under vigorous stirring with a homomixer. After about 30 minutes' stirring, the resulting suspension having a pH of 6.42 at 33.1° C. was filtered and the recovered coprecipitate was washed with water and suspended in deionized water to provide in total 700 ml of the suspension. Said suspension was transferred to an autoclave of 0.98 liter in capacity, and subjected to a hydrothermal reaction at 140° C. for 4 hours. Subsequently cooled suspension had a pH of 5.75 at 28.7° C. The resulting precipitate was separated by filtration, washed with water and then with acetone, and dried at 75° C. for 15 hours. The yield of the dried product was 34.1 g, which was ground and sieved with a 100-mesh sieve.

The product was identified to be a chalcoalumite-type compound by XRD measurement and chemical analysis.

| Main d(Å) values by XRD measurement | | |
|---|---|---|
| 8.58 Å | 6.12 | 1.486 |
| 4.28 | 5.46 | 1.463 |
| 4.19 | 5.11 | |
| 7.93 | 4.80 | |
| 6.71 | 3.06 | |
| 6.40 | 2.52 | |

The chemical formula obtained upon the chemical analysis was as follows:

$$Zn_{0.34}Li_{1.04}Al_{4.0}(OH)_{12.06}(SO_4)_{0.83} \cdot 1.8H_2O.$$

Example 5

In deionized water, 10.0 g of special grade reagent copper sulfate ($CuSO_4 \cdot 5H_2O$), 3.42 g of special grade reagent lithium sulfate ($Li_2SO_4 \cdot H_2O$) and 129 ml of aqueous aluminum sulfate solution at a concentration of 1.03 mol/liter were dissolved and the total amount of the solution was adjusted to 600 ml. The solution was put in a 1-liter beaker, to which 235 ml of first grade reagent 3.4N NaOH was added at room temperature under vigorous stirring with a homomixer. After about 30 minutes' stirring, the resulting suspension having a pH of 6.63 at 34.8° C. was filtered, and so recovered coprecipitate was washed with water and suspended in de-ionized water to provide about 700 ml of the suspension. Said suspension was transferred to an autoclave of 0.98 liter in capacity, and subjected to a hydrothermal reaction at 140° C. for 4 hours. Subsequently cooled suspension had a pH of 5.30 at 26.5° C. The resulting precipitate was separated by filtration, washed with water and then with acetone, and dried at 75° C. for 15 hours. The yield of the dried product was 29 g, which was ground and sieved with a 100-mesh sieve.

The product was identified to be a chalcoalumite-type compound by XRD measurement and chemical analysis.

| Main d(Å) values by XRD measurement | | |
|---|---|---|
| 8.53 Å | 6.07 | 1.486 |
| 4.26 | 5.45 | 1.463 |
| 4.19 | 5.10 | |
| 7.89 | 4.79 | |
| 6.71 | 3.05 | |
| 6.39 | 2.51 | |

The chemical formula obtained upon the chemical analysis was as follows.

$$Cu_{0.56}Li_{0.50}Al_{4.0}(OH)_{12.16}(SO_4)_{0.73} \cdot 3.2H_2O.$$

Example 6

In deionized water, 17.9 g of special grade reagent disodium hydrogenphosphate ($Na_2HPO_4 \cdot 12H_2O$) was dissolved and the total amount of the solution was adjusted to 600 ml. The solution was put in a 1-liter beaker and maintained at 35° C., to which 21.7 g of the synthetic chalcoalumite-type compound as obtained in Example 2 was added under agitation with a stirrer. The reaction was carried out for 30 minutes at 35° C. The resulting precipitate was separated by filtration, washed with water and then with acetone, and dried at 75° C. for 15 hours. The yield of the dried product was 20.4 g, which was ground and sieved with a 100-mesh sieve.

The product was identified to be a chalcoalumite-type compound by XRD measurement and chemical analysis.

| Main d(Å) values by XRD measurement | | |
|---|---|---|
| 8.50 Å | 6.12 | 1.486 |
| 4.26 | 5.46 | 1.463 |
| 4.18 | 5.12 | |
| 7.90 | 4.79 | |
| 6.71 | 3.05 | |
| 6.39 | 2.51 | |

The chemical formula obtained upon the chemical analysis was as follows.

$$Zn_{0.54}Li_{0.42}Al_{4.0}(OH)_{12.08}(HPO_4)_{0.49}(SO_4)_{0.19}(CO_3)_{0.03} \cdot 1H_2O$$

Comparative Example 1

First grade reagents zinc chloride and aluminum sulfate were dissolved in deionized water to form a mixed solution containing them at concentration levels of 0.16 mol/liter and 0.32 mol/liter, respectively. Also an adequate amount of a first grade reagent 3.4N aqueous sodium hydroxide solution was prepared. Into a reaction vessel from which the reaction suspension could be continuously withdrawn (capacity: about 1 liter), 500 ml of deionized water was poured and into which said mixed solution of zinc chloride and aluminum sulfate and the aqueous sodium hydroxide solution were added simultaneously under stirring by means of quantitative pumps. The reaction was continued for a suitable time, while maintaining the pH of the reaction suspension at 6.0±0.2 (liquid temperature: 32° C.). Seven hundred (700) ml of the reaction suspension was filtered and the recovered coprecipitate was washed with water and suspended in deionized water to provide in total 700 ml of the suspension which was then transferred into an autoclave of 0.98 liter in capacity and aged at 140° C. for 4 hours. Thereafter the suspension was cooled and the resulting precipitate was filtered off, washed with water and then with acetone, and dried at 75° C. for 15 hours. The dried product was ground and sieved with a 100-mesh sieve.

The product was identified to be a chalcoalumite compound by XRD measurement and chemical analysis.

The chemical formula obtained upon the chemical analysis was as follows.

$$Zn_{0.93}Al_{4.0}(OH)_{11.98}(SO_4)_{0.94} \cdot 3.1H_2O.$$

Example 7

In deionized water, 8.63 g of first grade reagent zinc sulfate ($ZnSO_4 \cdot 7H_2O$), 2.56 g of special grade reagent lithium sulfate ($Li_2SO_4 \cdot H_2O$) and 97 ml of aqueous aluminum sulfate solution at a concentration of 1.03 mol/liter were dissolved and the total amount of the solution was adjusted to 700 ml. The solution was put in a 1-liter beaker, to which 177 ml of first grade reagent 3.4N NaOH was added at room temperature under vigorous stirring with a stirrer. After about 30 minutes' stirring, the resulting suspension had a pH of 6.71 (32.4° C.). Filtering the suspension, the recovered solid was washed with water and suspended in deionized water to provide 700 ml of the suspension. The suspension was transferred to an autoclave and subjected to a hydrothermal reaction at 140° C. for 4 hours. Subsequently cooled suspension had a pH of 6.12 at 25° C. The resulting precipitate was filtered, washed with water, and subsequently washed with 800 ml of aqueous $Na_2CO_3$ solution at a concentration of 0.05 mol/liter and with water, by the order stated. Thus washed solid and 600 ml of deionized water were placed in a 1-liter capacity vessel, formed into a suspension with a stirrer and heated to 80° C. Separately, 1.2 g of sodium stearate (purity: 86%) and 150 ml of deionized water were put in a 200-ml beaker and heated to about 80° C. to dissolution. The solution was poured into the afore-formed suspension under stirring and maintained at 80° C. for 30 minutes. After filtration and aqueous washing, the filter cake was dried at 75° C. for 24 hours, and the dried product was ground and sieved through a 100-mesh wire net. The yield of the dried product was 20 g.

The product was identified to be a chalcoalumite-type compound by XRD measurement and chemical analysis.

| Main d(Å) values by XRD measurement | | |
| --- | --- | --- |
| 8.48 Å | 6.37 | 3.05 |
| 4.26 | 6.10 | 2.51 |
| 4.19 | 5.43 | 1.481 |
| 7.85 | 5.10 | 1.460 |
| 8.70 | 4.78 | |

The chemical formula obtained upon the chemical analysis was as follows.

$$Zn_{0.56}Li_{0.41}Al_4(OH)_{12.49}(SO_4)_{0.33}(CO_3)_{0.19} \cdot 1.5H_2O.$$

Effect of the invention

The present invention provides a novel synthetic chalcoalumite-type compounds which are expected to be useful in versatile fields according to their construction, composition and physical properties, as adsorbing agents of acidic substances, anion exchangers, infrared absorbing agents for agricultural films, deodorants, recording media for ink jet, and the like.

What is claimed is:

1. A synthetic chalcoalumite compound represented by the following formula (1):

$$M_{a-x/2}^{2+}Li_x^{1+}Al_4^{3+}(OH)_b(A^{n-})_c \cdot mH_2O \qquad (1)$$

wherein, $M^{2+}$ represents at least one of the following divalent metal ions:

$Zn^{2+}$, $Cu^{2+}$, $Ni^{2+}$ or $Mg^{2+}$, $0.6<a<1.2$, $0<x<1.4$, with the proviso that $a-x/2>0$, $11<b<13$, $A^{n-}$ is at least one member of the group consisting of $SO_4^{2-}$, $HPO_4^{2-}$, $CO_3^{2-}$, $SiO_3^{2-}$, $SO_3^{2-}$, $HPO_3^{2-}$, $NO_3^-$, $H_2PO_4^-$ and $OH^-$, $0.5<c<1.2$, and m represents a number of 1 to 4.

2. A synthetic chalcoalumite compound of claim 1, the surfaces of whose particles are treated with at least one surface-treating agent selected from the group consisting of higher fatty acids, anionic surfactants, phosphoric esters, silane coupling agents, titanate coupling agents and aluminum-derived coupling agents.

3. A process for producing a synthetic chalcoalumite compound of claim 1, which comprises subjecting a water-soluble aluminum salt, lithium salt and a compound, which is water-soluble at a pH range of from about 4 to about 7, of at least one element selected from the group consisting of Zn, Cu, Ni and Mg, to a coprecipitation reaction with an alkali at a reaction pH within a range from about 4 to about 7 and at a temperature within a range from about 100 to 50° C., and then subjecting the coprecipitate to a hydrothermal reaction at a pH within said range and at a temperature within a range from about 80° C. to about 170° C.

4. A process for producing a synthetic chalcoalumite compound of claim 1, which comprises adding to an aqueous solution which contains at least a metal ion selected from the group consisting of $Zn^{2+}$, $Cu^{2+}$, $Ni^{2+}$ and $Mg^{2+}$, and $Li^{1+}$ and $Al^{3+}$ metal ions, the atomic ratio of $Li^{1+}/M^{2+}$ in the solution being not higher than 5.0 and the atomic ratio of $M^{2+}/Al^{3+}$ in the solution ranging from 0.05 to 0.25; 0.85 to equivalents to the sum of the monovalent, divalent and trivalent metal ions of an alkali, at a reaction pH within a range from about 4 to about 7 and at a temperature within a range from about 10° to about 50° C. under stirring and subjecting the resulting coprecipitate as it is to a hydrothermal reaction at the same pH range and at a temperature range from about 80° C. to about 170° C. for about 1 to about 24 hours; or filtering the coprecipitate washing with water, suspending in water and subjecting the suspension to a hydrothermal reaction at the same pH range and at a temperature range from about 80° C. to about 170° C. for about 1 to about 24 hours.

5. A process for producing a synthetic chalcoalumite compound of claim 1, which comprises subjecting a suspension having a pH within a range from about 4 to about 7, which is formed by mixing an aqueous solution containing a compound of at least one element selected from the group consisting of Zn, Cu, Ni and Mg, said compound being water-soluble at a pH range from about 4 to about 7, and sulfates, nitrates or chlorides of Li and Al, with at least one compound selected from the group consisting of ammonia, sodium hydroxide, potassium hydroxide, magnesium hydroxide, magnesium oxide, sodium aluminate and zinc oxide, to a hydrothermal reaction at a pH within a range from about 4 to about 7 and at a temperature from about 80° C. to about 170° C. for about 1 to about 24 hours.

6. A process for producing a synthetic chalcoalumite compound of claim 1, which comprises preparing a chalcoalumite-type compound of formula (1) of claim 1 in which $A^{n-}$ is $SO_4^{2-}$, and then substituting a part of $SO_4^{2-}$ in said compound with an anion selected from the group consisting of $HPO_4^{2-}$, $CO_3^{2-}$, $SiO_3^{2-}$, $SO_3^{2-}$, $HPO_3^{2-}$, $NO_3^-$, $H_2PO_4^-$ and $OH^-$.

* * * * *